S. KRZYWORZYCKI.
BELT FASTENER.
APPLICATION FILED JULY 6, 1917.
1,267,325.
Patented May 21, 1918.
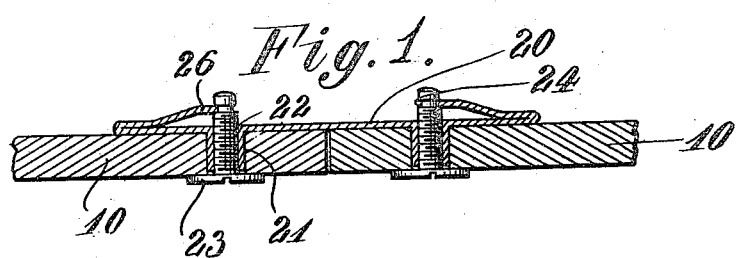
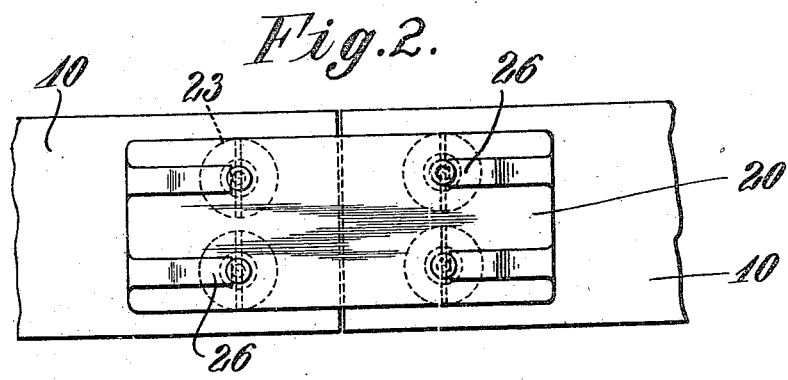
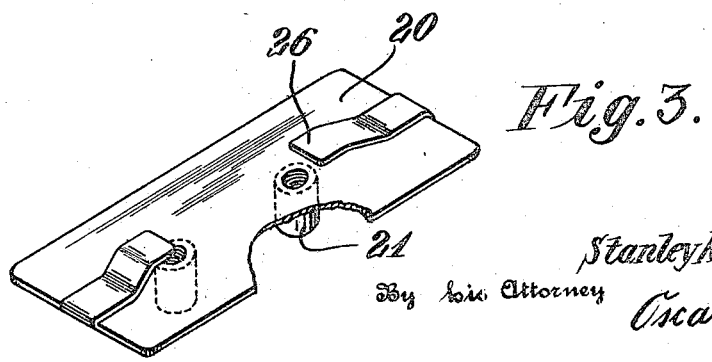
Inventor
Stanley Krzyworzycki.
By his Attorney
Oscar Geier

UNITED STATES PATENT OFFICE.

STANLEY KRZYWORZYCKI, OF DETROIT, MICHIGAN.

BELT-FASTENER.

1,267,325.  Specification of Letters Patent.  Patented May 21, 1918.

Application filed July 6, 1917. Serial No. 179,000.

*To all whom it may concern:*

Be it known that I, STANLEY KRZYWORZYCKI, a subject of the Emperor of Austria, resident of Detroit, county of Wayne, and State of Michigan, have invented certain new and useful Improvements in Belt-Fasteners, of which the following is a specification.

This invention relates to improvements in belt fastening devices, and has as its principal object the provision of means whereby the ends of a belt may be securely held in proper relation to each other.

A further object is to provide such fastening means in forms which may be readily engaged with the belt, and finally, to provide resilient means whereby the engaging means are held from displacement.

These and other like objects are attained by the novel construction and combination of parts hereafter described and shown in the accompanying drawings, forming a material part of this disclosure, and in which:—

Figure 1 is a longitudinal sectional view taken through parts of the belt and showing the application of the invention.

Fig. 2 is a top plan view of the same, and

Fig. 3 is a perspective view showing one of the fastening elements.

In the drawing, a thin, flat, spring plate element 20 is used, the same having a plurality of internally threaded sleeves 21 extending from one side adapted to receive the screws 22, formed with enlarged flat heads 23, the extending point ends of the screws having annular grooves or recesses 24 receptive of a spring element 26 formed with the plates 20 by means of which the screws are normally prevented from turning, and it will be obvious that should the screws tend to unscrew, the wedge effect of the elements 26 will act to hold them rigidly in place, clamping the belt 10 between the screw heads and spring plate in an obvious manner.

Having thus described my invention, what I claim as new, and desire to secure by Letters Patent, is:—

1. In a belt fastener, the combination with a thin spring plate, of a plurality of internally threaded sleeves extending from one side thereof, screws having enlarged heads fitting said sleeves, and means formed with said plate preventing the removal of said screws.

2. In a belt fastener, the combination with a thin spring plate, of a plurality of internally threaded sleeves extending from one side thereof, screws having enlarged heads fitting said sleeves, extensions formed on said screws, said extensions having an annular groove, and reëntrantly turned, spring projections formed with said plates adapted to engage in the mentioned grooves whereby said screws are prevented from loosening.

In testimony whereof I have affixed my signature this 27th day of June, 1917.

STANLEY KRZYWORZYCKI.

Copies of this patent may be obtained for five cents each, by addressing the "Commissioner of Patents, Washington, D. C."